US011373206B2

(12) United States Patent
Olson

(10) Patent No.: US 11,373,206 B2
(45) Date of Patent: Jun. 28, 2022

(54) SYSTEM, METHOD, AND APPARATUS FOR DETECTING UNAUTHORIZED ADVERTISEMENT

(71) Applicant: PC Matic Inc, Sioux City, IA (US)

(72) Inventor: Anthony Olson, Dakota Dunes, SD (US)

(73) Assignee: PC MATIC, INC., Sioux City, IA (US)

( * ) Notice: Subject to any disclaimer, the term of this patent is extended or adjusted under 35 U.S.C. 154(b) by 0 days.

(21) Appl. No.: 17/019,731

(22) Filed: Sep. 14, 2020

(65) Prior Publication Data

US 2022/0084065 A1 Mar. 17, 2022

(51) Int. Cl.
G06Q 30/00 (2012.01)
G06Q 30/02 (2012.01)
H04L 9/40 (2022.01)

(52) U.S. Cl.
CPC ......... *G06Q 30/0248* (2013.01); *H04L 63/10* (2013.01)

(58) Field of Classification Search
CPC .............................. G06Q 30/0248; H04L 63/10
See application file for complete search history.

(56) References Cited

U.S. PATENT DOCUMENTS

| 10,437,988 B1* | 10/2019 | Newstadt | G06F 21/52 |
| 2007/0095902 A1* | 5/2007 | Fukasawa | G06K 15/00 235/382 |
| 2007/0250930 A1* | 10/2007 | Aziz | H04L 63/14 726/24 |
| 2009/0182818 A1* | 7/2009 | Krywaniuk | H04L 51/12 709/206 |
| 2013/0138735 A1* | 5/2013 | Kanter | H04L 51/32 709/204 |
| 2014/0052508 A1* | 2/2014 | Pandey | G06Q 30/02 705/14.4 |
| 2017/0034344 A1* | 2/2017 | Cukierman | H04M 1/2757 |
| 2017/0257393 A1* | 9/2017 | De Barros | H04L 63/1416 |
| 2020/0019987 A1* | 1/2020 | Viola | G06F 40/30 |

OTHER PUBLICATIONS

Dhannoon; Content_dissemination_over_VANET_Boosting_utility_based_heuristics_using_interests; IEEE 2013; pp. 106-113; 2013.*
Mondal; A_Review_on_Detecting_Phishing_URLs_using_Clustering_Algorithms; IEEE 2019; pp. 1-6; 2019.*
Simha; Enabling_Technologies_for_Internet_of_Things_amp_Its_Security_Issues; 2018 IEEE; pp. 1849-1852; 2018.*

* cited by examiner

*Primary Examiner* — Radu Andrei
(74) *Attorney, Agent, or Firm* — D2 Worldwide LLC; Frank Liebenow

(57) ABSTRACT

A method of protecting a device from unauthorized advertisements includes intercepting data from the Internet that is to be displayed by a browser and determining if the data includes an advertisement. If the data includes an advertisement, the advertisement is analyzed to determine if the advertisement is an unauthorized advertisement and if the advertisement is an unauthorized advertisement, a warning message is displayed.

10 Claims, 15 Drawing Sheets

SYSTEM, METHOD, AND APPARATUS FOR DETECTING UNAUTHORIZED ADVERTISEMENT

FIELD

This invention relates to the field of computer advertising and more particularly to a system for detecting and warning of unauthorized advertisements.

BACKGROUND

Currently, many computer systems provide a vast amount of useful information and access through web browsers and web search engines. There is a huge amount of information stored within the Internet and most computer users take for granted that it is there twenty-four hours a day and does not cost anything to access. One would certainly understand that it costs a huge amount of money to store and manage all of this information and run the servers that allow rapid access so that when you ask "who is Clark Gable," you receive results with biographic information and pictures in a few seconds, but who pays for all of this infrastructure? Many services are supported through advertisements. Advertisements appear on almost every web page and the operators of the search engines, weather report web pages, news pages, etc., earn micro-cents each time an advertisement is presented on those pages and the earn even more if the viewer clicks on the advertisement, hopefully to buy a product or service.

Most of the advertisements are for real products or real services from legitimate companies selling products such as food and clothing or services such as auto repairs or virus protection software. Accessing such advertisements (e.g. by clicking on the advertisement) is generally safe and if the user is interested in the product, the overall experience will be fine and they will pay a fair price and receive the product as expected.

Unfortunately, some people/companies advertise either illegally or unethically or, just plain misleading. For example, one might advertise customer support for a well-known company such as Microsoft® but they are not affiliated with that company and, sometimes, to fool researchers, such companies purposely misspell the target company name (e.g. "Micr0s0ft"). Often, such advertisements include a link to the advertiser's website or a phone number. When the unsuspecting user (e.g. one who seeks support for a Microsoft® product) navigates to that website or calls the phone number, the website or person is careful not to divulge their real identity and the advertiser might provide some level of support or answers, but will collect money from the user and will likely provide less quality support than the actual company.

Sometimes such advertisers pay for advertising, often called "display advertising," which appears in banners of webpages. Sometimes such advertisers pay for keywords, often called "paid search," and their advertisements appear as search results when the user's search includes those keyword(s). In some cases, searches for certain keywords return a whole page of advertisements before there is any display of the real web pages that are sought.

Further, for many corporations, there is a need or desire to control advertisements that are displayed to employees. Some use ad blockers that are known to block all advertisements, but when these are used, some content providers detect the ad blocker and prevent the user from receiving the content they seek as the user will not display the advertisements. Therefore, the employees wanting to see certain content do not want to use ad blockers or disable the ad blockers so they can see that content. Instead, these corporations need the ability to selectively prevent the presentation of certain advertisements to employees, even if those advertisements are not unauthorized advertisements in the context of this disclosure. For example, a company that is sensitive to a certain group of employees will block all advertisements for products that could offend that group of employees.

What is needed is a system that will recognize illegal, unauthorized, or unethical advertisements and either suppress the advertisement or overlay the advertisement with a warning message.

SUMMARY

In one embodiment, a system for monitoring advertisements on a device includes a device protected by the system for monitoring advertisements. The device has a processor and software running on the processor causes the processor to intercept data that is being sent to a browser of the device and the software causes the processor to search the data for advertising. If the software detects an advertisement, the software causes the processor to analyze the advertisement and to determine if the advertisement is an unauthorized advertisement. If the software determines that the advertisement is an unauthorized advertisement, the software causes the processor to display a warning message, for example, over where the advertisement is displayed by the browser.

In one embodiment, a method of protecting a device from unauthorized advertisements is disclosed including intercepting data from the Internet that is to be displayed by a browser and determining if the data includes an advertisement. If the data includes an advertisement, the advertisement is analyzed to determine if the advertisement is an unauthorized advertisement and if the advertisement is an unauthorized advertisement, a warning message is displayed.

In another embodiment, program instructions tangibly embodied in a non-transitory storage medium for protecting a device from unauthorized advertisements. The program instructions include computer readable instructions running on a processor of the device that intercept data from the Internet that is to be displayed by a browser. The computer readable instructions running on the processor of the device determine if the data includes an advertisement and if the data includes the advertisement, the computer readable instructions running on the processor of the device analyzes the advertisement and determines if the advertisement is an unauthorized advertisement. If the advertisement is an unauthorized advertisement, the computer readable instructions running on the processor of the device display a warning message.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
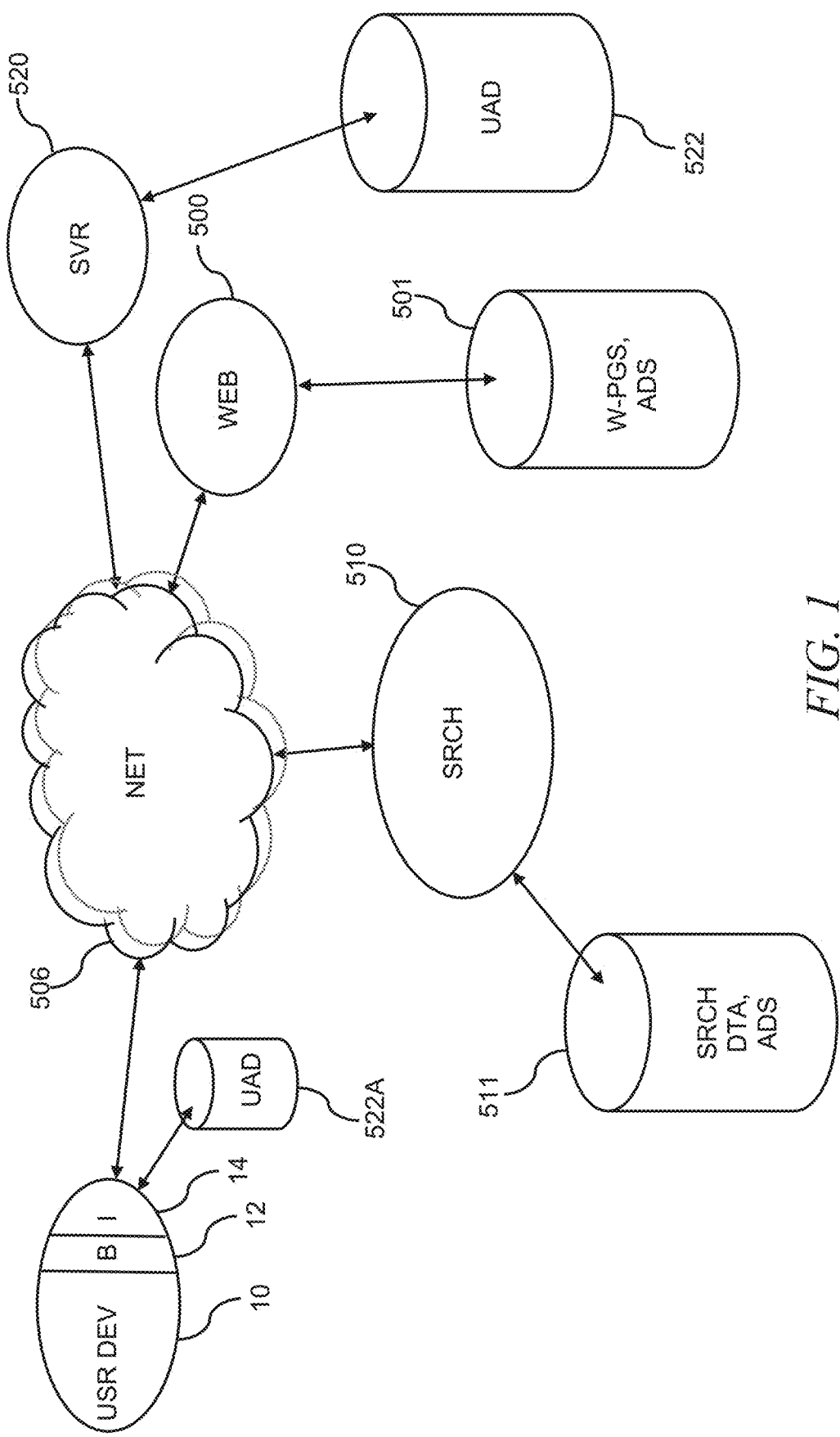
FIG. 1 illustrates a data connection diagram of the advertising detection system.

Reference will now be made in detail to the presently preferred embodiments of the invention, examples of which are illustrated in the accompanying drawings. Throughout the following detailed description, the same reference numerals refer to the same elements in all figures.

In general, the computer security system provides a level of information and knowledge to a user who might be subject to illegal, unauthorized, or unethical advertisements during web browsing.

Throughout this description, the term, "user device" refers to any device that has a processor and runs software, and is capable of accessing web services. Examples of such include, but are not limited to, personal computers, tablet computers, smartphones, and smart watches. The term, "user" refers to a human that has an interest in the device, perhaps a user who is using the device.

Throughout this document, any illegal, misrepresenting, usurping, unassociated, usurping, unauthorized, or unethical advertisements will be referred to as "unauthorized advertisements." For example, an advertisement that utilizes the name, likeness, look and feel, images/names of key personnel, etc., of another company are likely unauthorized, possibly unethical and, quite possibly illegal as they often infringe upon the company's intellectual property. Unfortunately, with the Internet being world-wide, it is difficult to police such unauthorized advertisements through legal channels as the company behind the unauthorized advertisement is often in a country that has minimal legal remedies for things like copyrights and trademarks.

Throughout this document, the steps taken upon detecting such unauthorized advertisements depend upon, for example, the severity of the unauthorized advertisement and internal settings, possibly based upon legal issues, moral issues, ethical issues, and user desires. For example, an advertisement that uses another's trademark or a copyrighted work of another would be classified as severe while and advertisement that says "we support <trademark name> products" may be perfectly legal, but misleading and, therefore, less severe. Throughout this document, the steps taken depend upon the severity and internal settings include, but are not limited to, blocking, muting, and warning or any combination of such. Blocking is when the user is not presented with the unauthorized advertisement. Muting is when the user is presented with the unauthorized advertisement but the unauthorized advertisement is modified in some way to make it less discernable, for example, the advertisement is dimmed, the contrast is lowered for the advertisement, the text of the advertisement is distorted, etc. Warning is when a message is displayed warning the user that this advertisement is an unauthorized advertisement, including at times reasons why it is unauthorized such as "Note this advertisement cites Micr0 which misleads those looking for Micro." In some embodiments, the warning is overlaid over the unauthorized advertisement (or muted advertisement) or displayed near such. In some embodiments, the unauthorized advertisement is blocked (suppressed) and, in some such embodiments, replaced by the warning message or warning advertisement.

Referring to FIG. 1, a data connection diagram of the advertising detection system is shown. In this example, a device 10 (e.g., personal computer, smartphone) communicates using a browser 12 (as known in the industry) through a network 506 (e.g. the Internet, local area network, etc.) to a web page server computer 500 (e.g. website) that hosts a web page to which the user is browsing or to a search engine server 510 (e.g. Google®). The web page server computer 500 has access to data storage 501 as an example, for containing data, advertisements, data, and web pages. The search engine server 510 has access to search data 511 that includes the countless data items that one can find using a search engine as well as advertisements, through which the search engine server 510 earns income to pay for the service.

In some embodiments, the browser 12 communicates through the network 506 to a security server computer 520 to maintain a database of cached heuristics 522A that identify the above noted recognize illegal, unauthorized, or unethical advertisements, herein called unauthorized advertisements. The security server computer 520 maintains a master database of heuristics 522 as new unauthorized advertisements are cataloged and periodically downloads updates to the interceptor 14 and the interceptor 14 updates the database of cached heuristics 522A for recognition of newer unauthorized advertisements.

As shown in FIG. 1, between the browser 12 and the network 506 is an interceptor 14. As will be described, the interceptor 14 monitors web data being received at the user device, looking for unauthorized advertisement such as illegal, unauthorized, or unethical advertisements. The interceptor 14 is a software module that is runs on the computer 5 (see FIG. 2) of the user device, typically initiated when the computer 5 initializes or when the browser 12 starts. In some embodiments, the interceptor 14 is loaded into the communications interfaces of the operating system running on the computer 5 and monitors all data traffic coming from the network 506. In some embodiments, the interceptor 14 is loaded into the browser 12 or is part of the browser 12 and, therefore, has greater control of what is displayed and what is not displayed by the browser 12.

Figure 2:
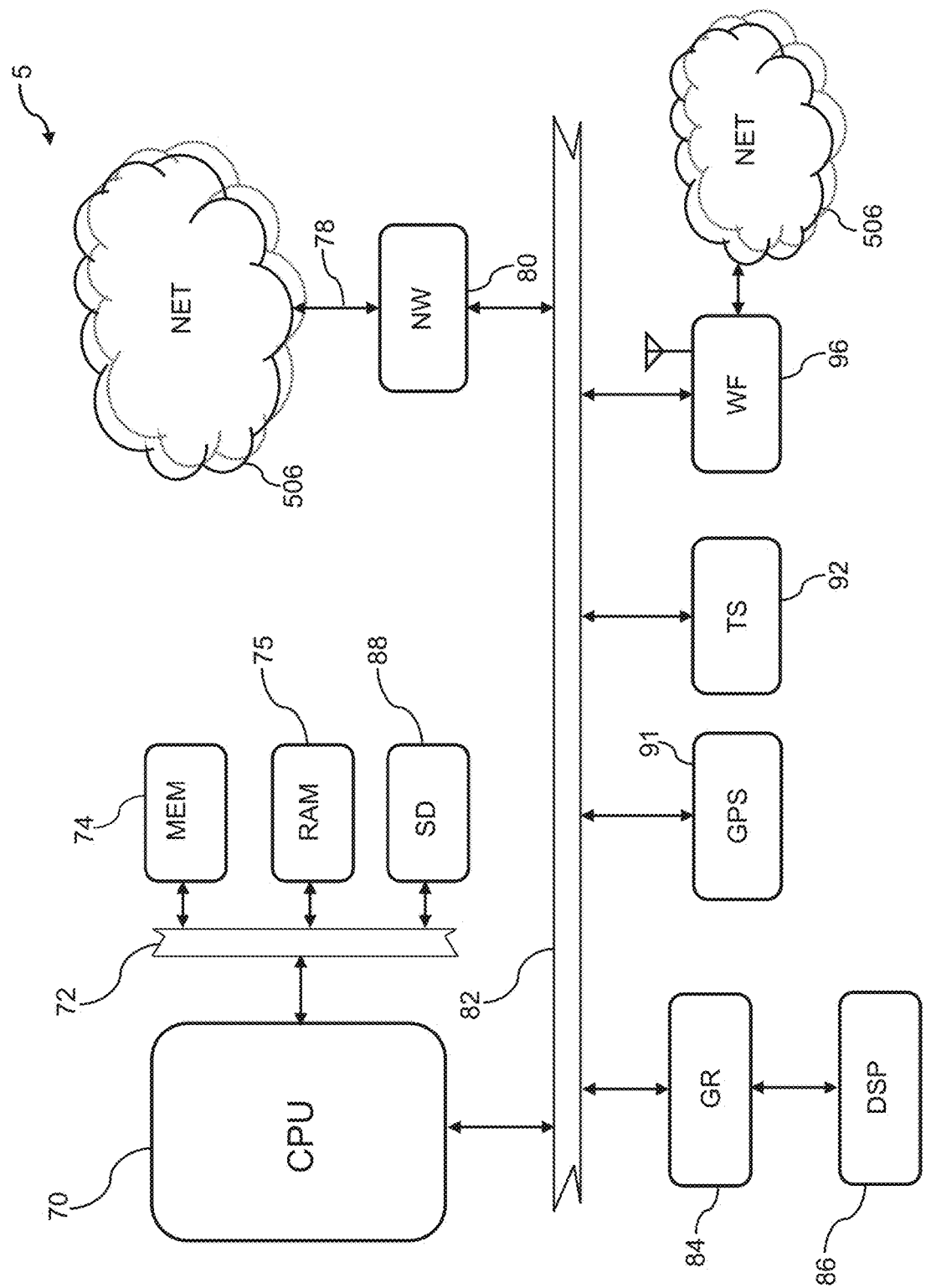
FIG. 2 illustrates a schematic view of a typical user device protected by the advertising detection system.

Referring to FIG. 2, a schematic view of a typical computer 5 used as an example of a device 10, web page server computer 500, search engine server 510, or security server computer 520 is shown. The present invention is in no way limited to any particular typical computer 5 systems. Many typical computers 5 that are processor-based devices are anticipated including, but not limited to smartphones, cellular phones, portable digital assistants, personal computers, smart watches, cordless phones, etc.

The example typical computer system 5 is shown in its simplest form. Different architectures are known that accomplish similar results in a similar fashion, and the present invention is not limited in any way to any particular system architecture or implementation. In this typical computer 5, a processor 70 executes or runs programs in a random-access memory 75. The programs are generally stored within a persistent memory 74 and loaded into the random-access memory 75 when needed. In some typical computers 5, a removable storage 88 (e.g., compact flash, SD) offers removable persistent storage. The processor 70 is any processor, typically a processor designed for phones. The persistent memory 74, random-access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some typical computers 5, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a network interface 80, a Global Positioning Subsystems (GPS) 91, a Wi-Fi transceiver 96, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other devices are known in the industry such as speakers, microphones, USB interfaces, cameras, microphones, Bluetooth transceivers, Wi-Fi transceiver 96, image sensors, temperature sensors, etc., the details of which are not shown for brevity and clarity reasons.

The network interface 80 connects the typical computer 5 to the network 506 (e.g. Internet) through any known or future protocol such as Ethernet (IEEE 802.3), etc. There is no limitation on the type of connection used. The network interface 80 provides data connections between the device 10, the web page server computer 500, the search engine server 510 and the security server computer 520 through any network 506. In some embodiments, the Wi-Fi transceiver 96 is used to connect to the network 506.

Figure 3:
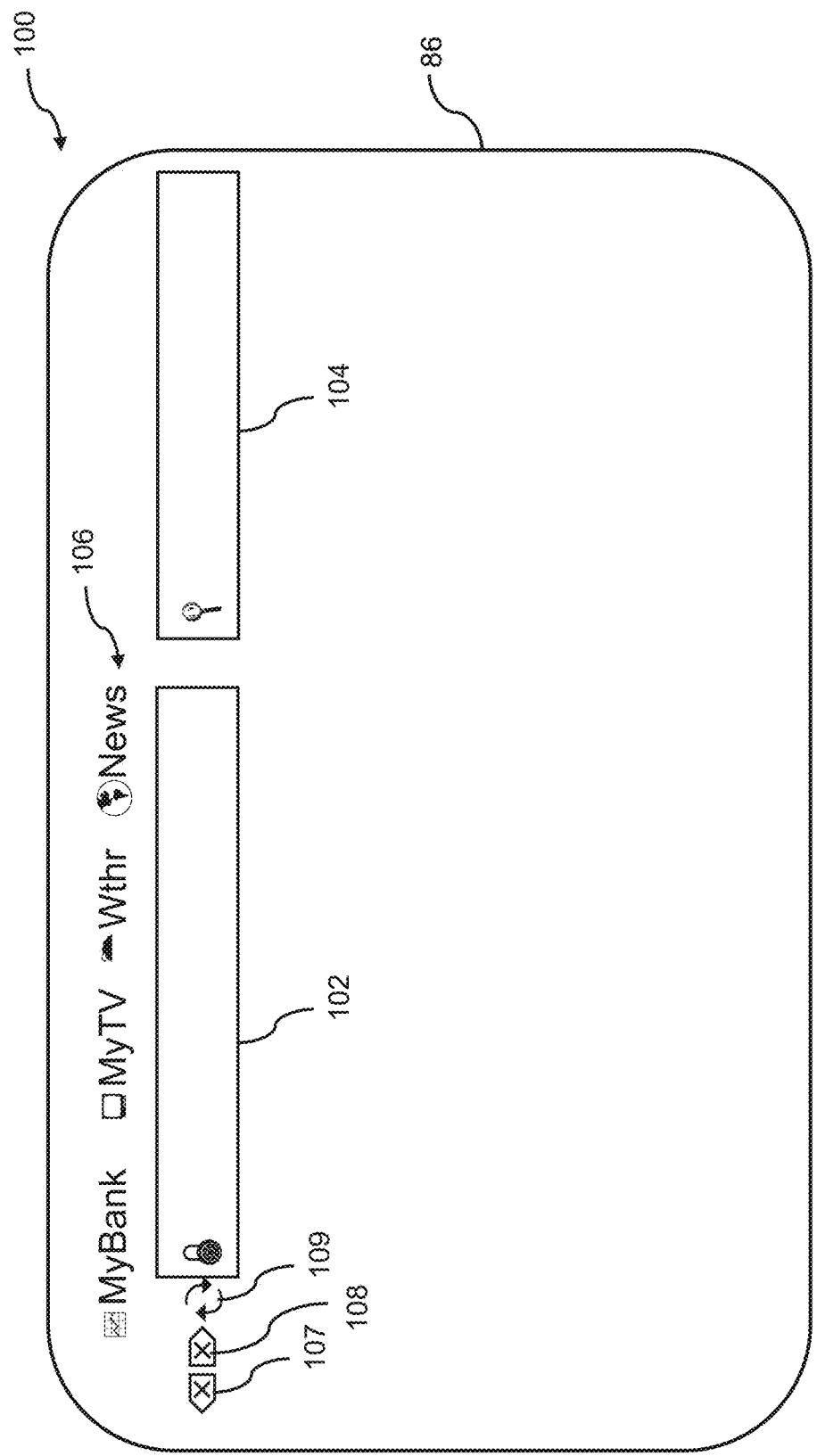
FIG. 3 illustrates a browser user interface of the prior art on a display of a user device.
Figure 4:
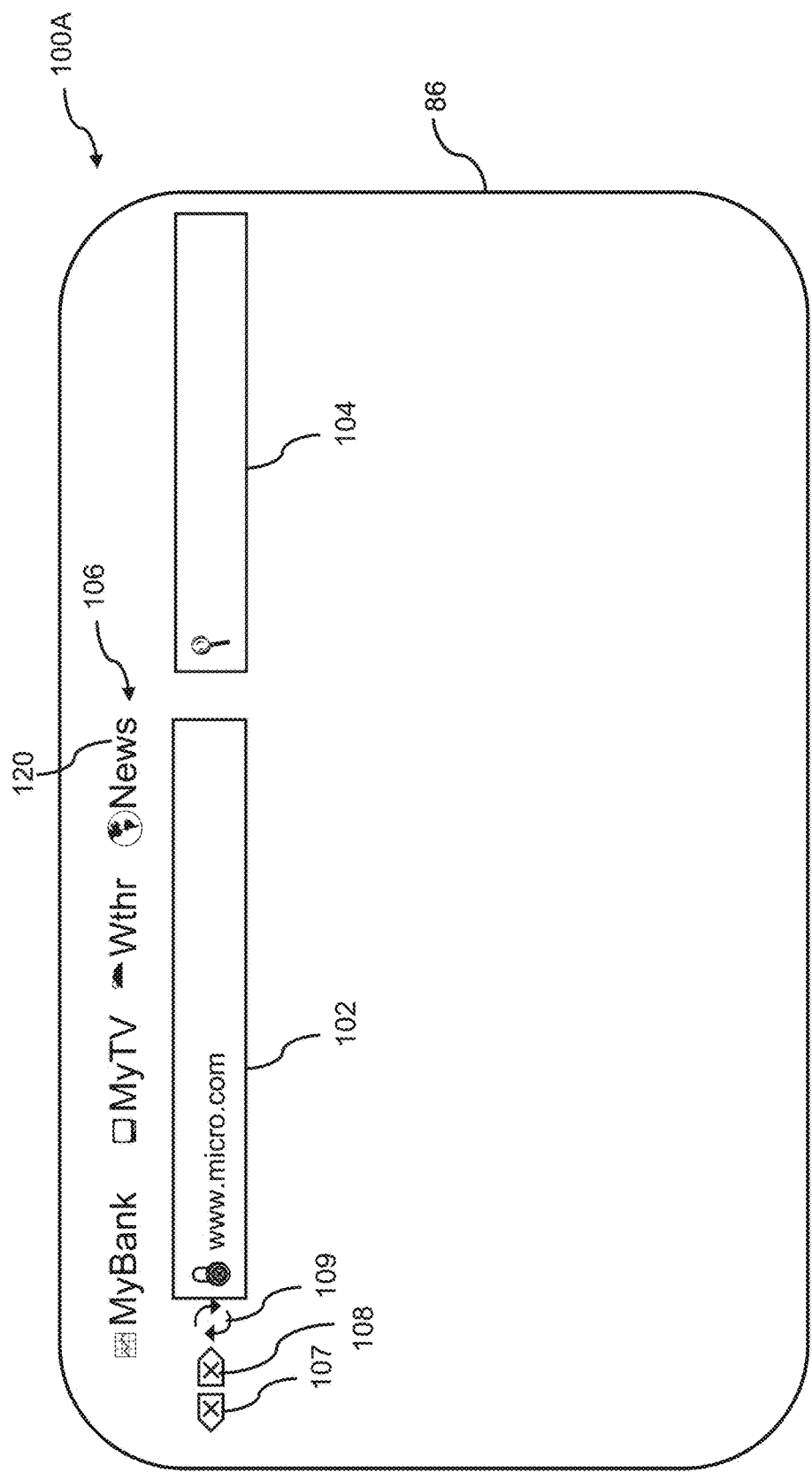
FIG. 4 illustrates the browser user interface of the prior art navigating to a web page.

Referring to FIGS. 3 and 4, a simplified browser user interface 100 of the prior art displayed on the display 86 of the device 10 is shown. In both figures, the simplified browser user interface 100 shown has several "favorite" links 106 to frequently browsed websites, a back-navigation button 107, a forward-navigation button 108, and a refresh button 109. As with many such browser user interfaces, there is a place to enter a web address 102 (e.g. a Unified Resource Locator or URL) and a place to enter a search term 104.

In the simplified browser user interface 100A of FIG. 4, a user has entered a web address 120 so that the user can visit the web page at www.micro.com.

Figure 5:
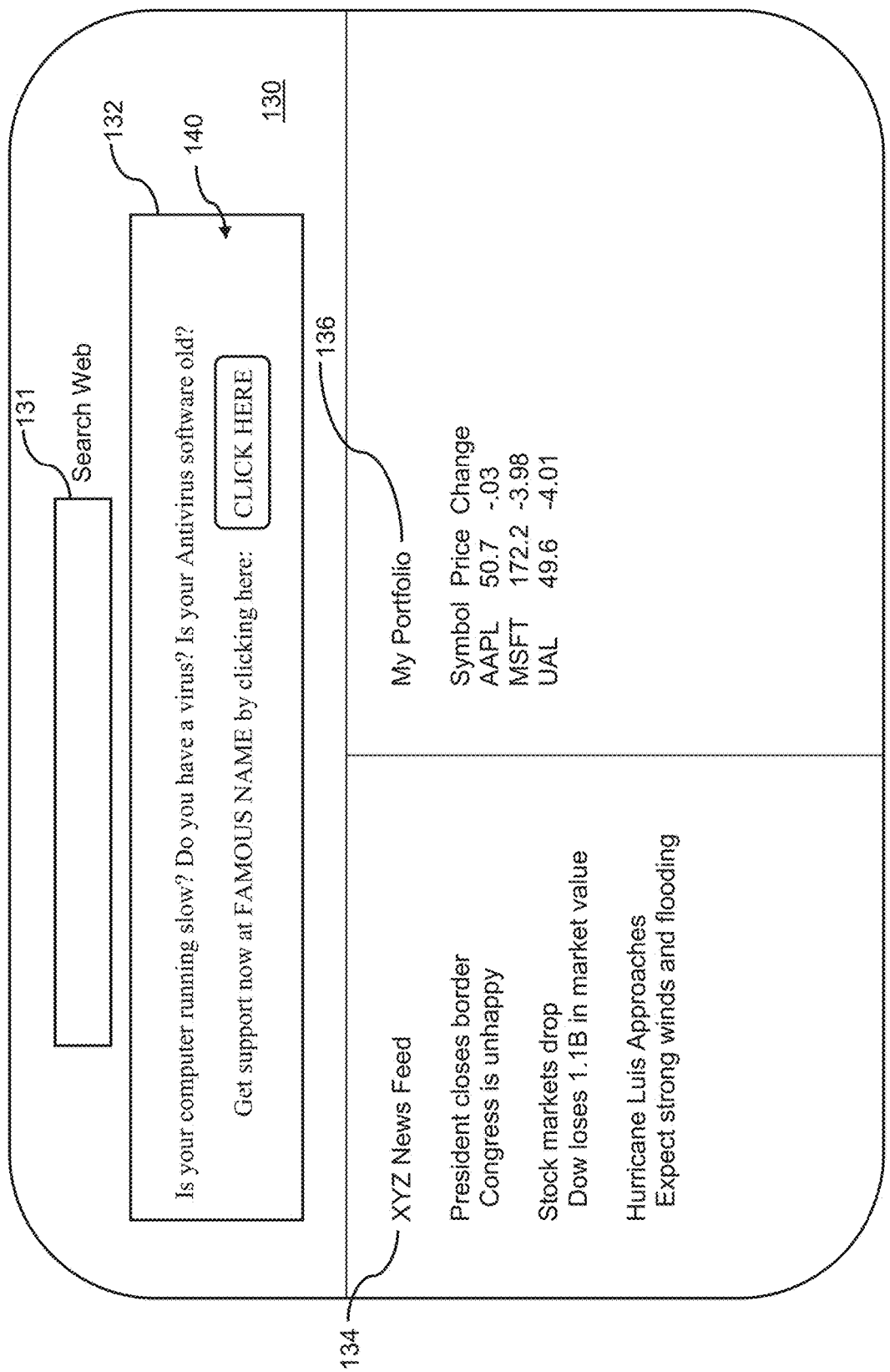
FIG. 5 illustrates a browser user interface of the prior art at the web page, showing an advertisement.

Referring to FIG. 5, a simplified web page 130 of the prior art is shown displayed on the display 86 of the device 10. This is an example of what the user has found at the web address "micro.com". As an example, this simplified web page 130 has a place to enter a search term 131, some news information or links 134 and some stock market information 136. The content of this simplified web page 130 is not important, only the fact that the user typed the web address 120 and reached this simplified web page 130.

It is well known that advertising supports many web-based services. Users who use the Internet find advertisements each time they search for something and often when they visit a website, for example, when the user clicks on a search result or navigates to a website of their favorites. Web pages are often crowded with advertisements that often over power the content that the user seeks. For example, searching for "weather in Toledo" results in an advertisement for a weather channel that occupies the entire first page of the search results, then on the next page you will find search results for local weather stations. If one clicks on the advertisement for that weather channel, there is no weather report for Toledo, only some general weather data, hurricane predictions, and fifteen advertisements (note that the content will vary day-to-day). Now, there is a place to search for weather in a designated city and, entering Toledo, results in the current weather in Toledo along with around twenty additional advertisements. These advertisements are what supports the web service and search engine providers, but sometimes these advertisements are misleading.

In this simplified web page 130, as with many, there is an advertisement field 132 reserved for advertisements, and in this example, there is an advertisement 140 shown. In general, advertisers pay the provider of the simplified web page 130 each time their advertisement 140 is displayed and, often, each time a user clicks on the advertisement 140. In this example, the advertisement 140 is for technical support from a company ("FAMOUS NAME"). Note that the name is spelled correctly and the advertisement is likely to be legitimate.

Figure 6:
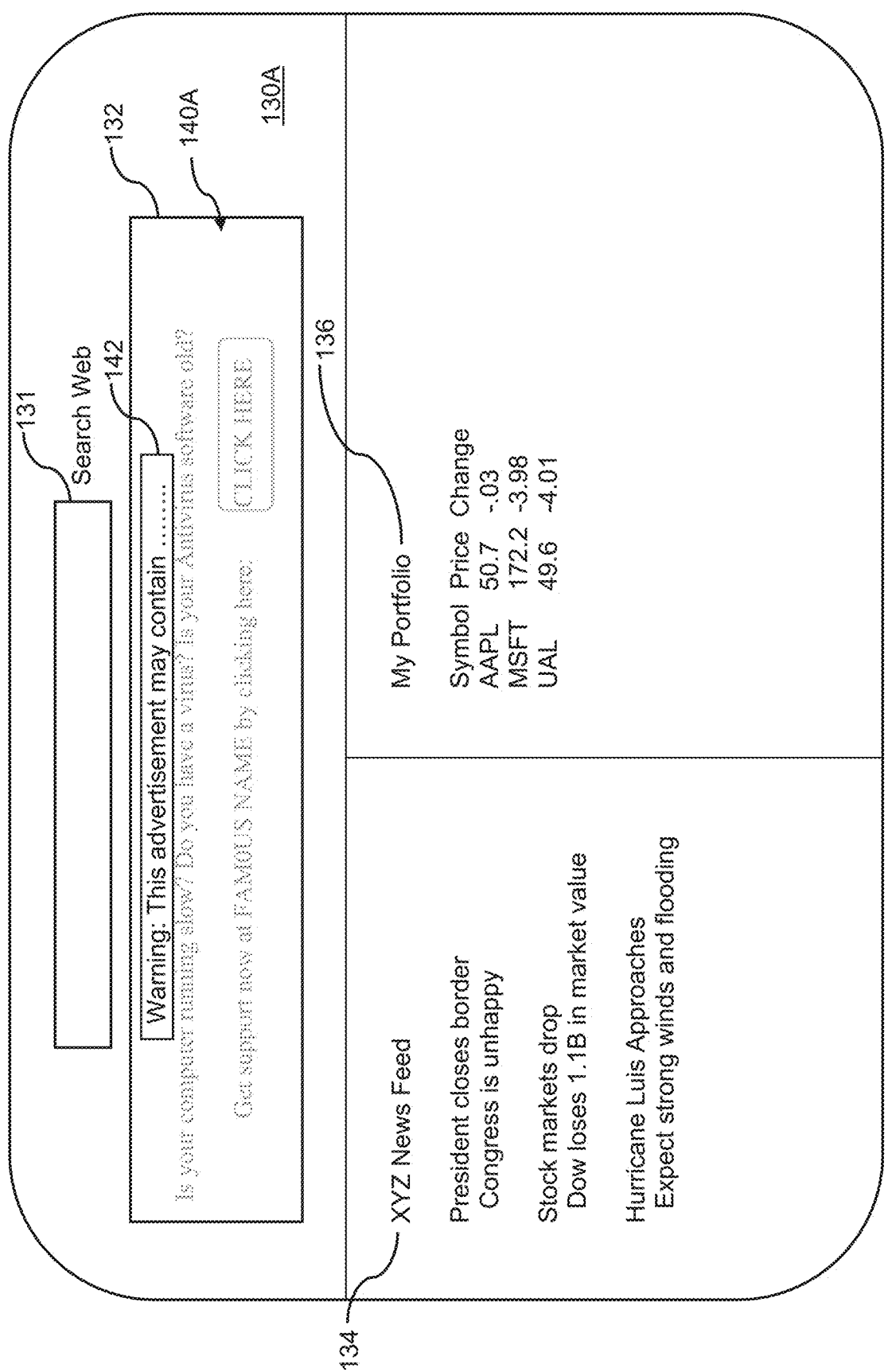
FIGS. 6 and 6A illustrate browser user interfaces at the web page on a display of a user device protected by the advertising detection system.
Figure 6A:
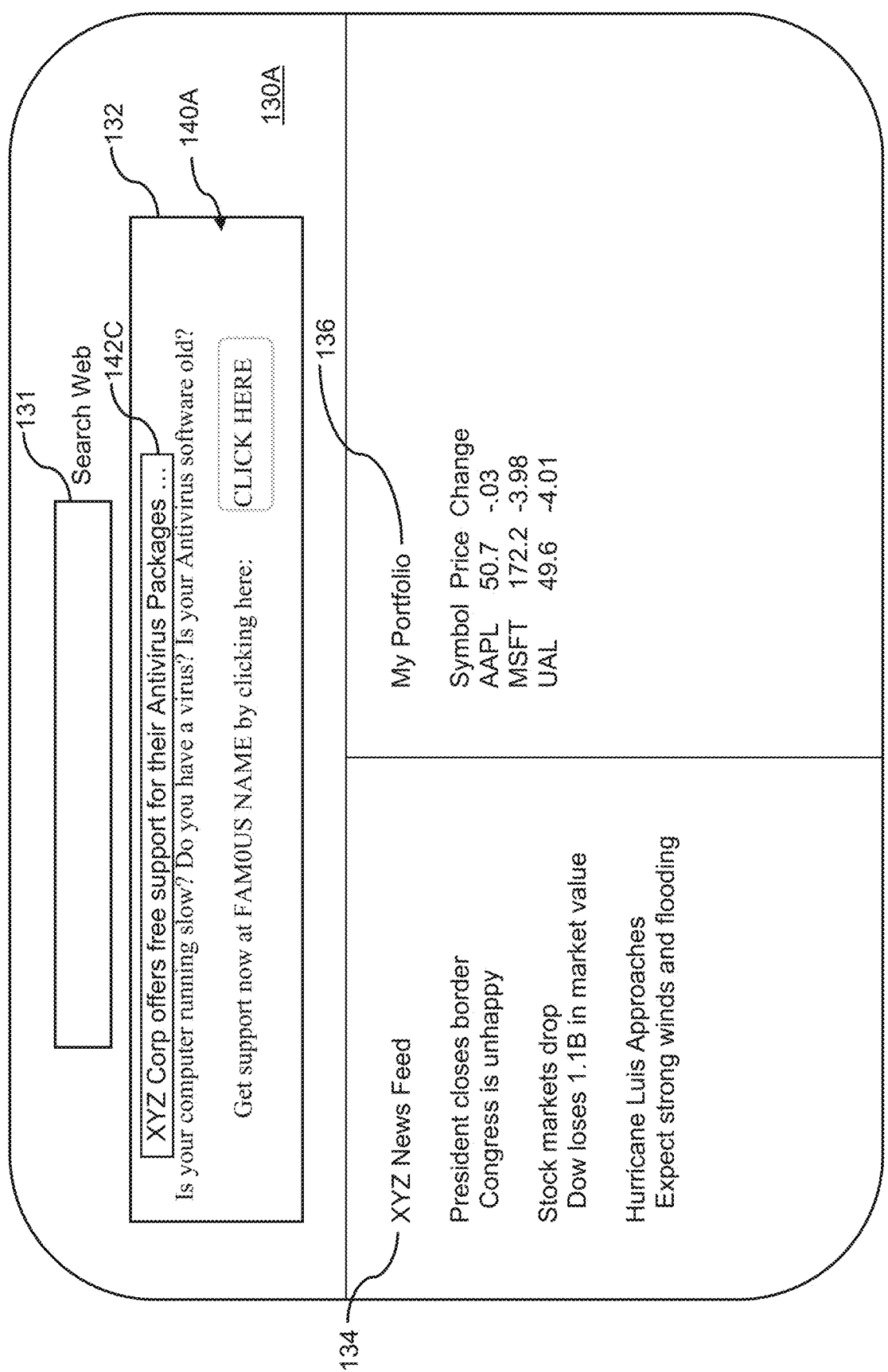
Figure 7:
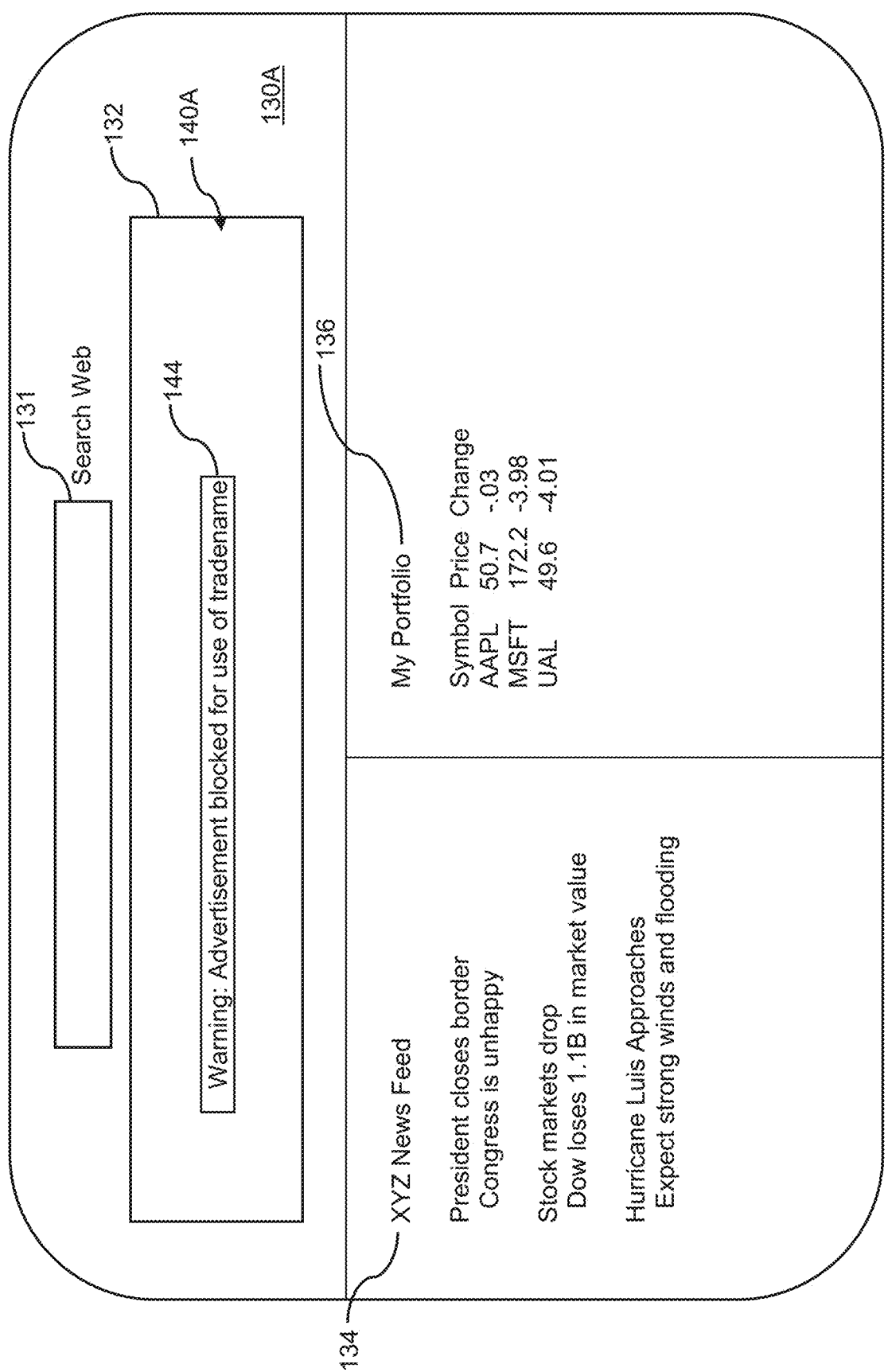
FIG. 7 illustrates a second browser user interface at the web page on a display of a user device protected by the advertising detection system.

Referring to FIGS. 6, 6A, and 7, simplified browser user interfaces 130A displayed on the display 86 of the device 10 is shown.

In this case, the advertisement 140A is likely to be an unauthorized advertisement as the word, "FAMOUS" is not spelled correctly, using a zero instead of an 'O' (e.g. "FAM0US"). Most users do not notice the misspelling and, if this service is of interest to the user, often the user will click on the advertisement 140A to find out more about the service. It is well known that such unauthorized services masquerade as the well-known services of major companies, referred to as "real party" throughout this document. The unsuspecting user accesses these services thinking they will get a quality of service as expected from the real party, but, instead, the user might wind up with lower quality service at a higher cost. For example, many major companies (real parties) offer free service, but this unauthorized service company might charge for service that is less than the quality that is free from the real party. Further, in some instances, there is no true service provided as the web site that will be accessed (or phone call made) is only there for obtaining personal information such as credit card numbers so that illegal debits can be made or other illegal activities.

In this example, the interceptor 14 has recognized that the advertisement 140A is an unauthorized advertisement from a signature of the advertisement 140A (e.g. recognition of the string "FAMOUS") and, in FIG. 6, has displayed a warning message 142 informing the user that clicking on this advertisement 140A is potentially dangerous and care should be taken. In some embodiments, the advertisement 140A is displayed in its original format (as shown in FIG. 6A) while in some embodiments the advertisement is displayed muted, for example with lower contrast (as shown in FIG. 6) or muted in any way known to further highlight the dangers present.

In FIG. 6A, the interceptor 14 has recognized that the advertisement 140A is either an unauthorized advertisement from a signature of the advertisement 140A (e.g. recognition of the string "FAMOUS") or, perhaps only misleading. For example, the advertisement 140A may be attempting to convince the user to click through and purchase support for a product that is already supported by the manufacturer/provider either under warrantee or at little or no cost. In FIG. 6, as an example, the browser has displayed a warning message 142C informing the user that support for the product/service described in the advertisement 140A may have a cost and that XYZ Corporation offers free support.

In FIG. 7, the interceptor 14 has recognized that the advertisement 140A is an unauthorized advertisement, again from a signature of the advertisement 140A (e.g. recognition of the string "FAMOUS"), and has suppressed the advertisement 140A (no longer visible) and, instead, displayed a stronger warning message 144 informing the user that the advertisement 140A has been blocked. In some embodiment in which the user has provided certain permissions, the interceptor 14 not only blocks the advertisement 140A that are unauthorized, but requests a replacement advertisement.

Figure 8:
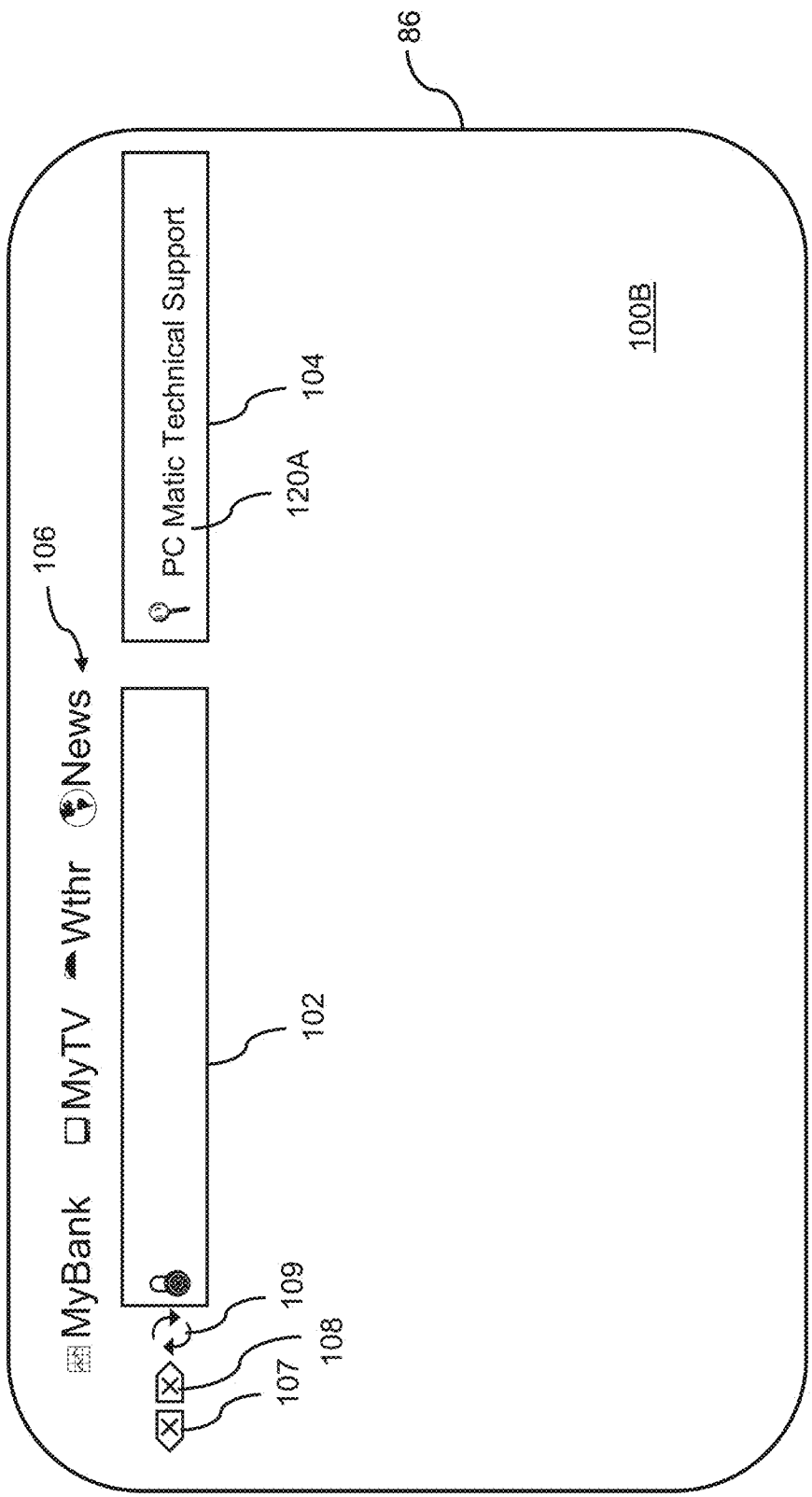
FIG. 8 illustrates a browser user interface of the prior art where search criteria are entered.
Figure 9:
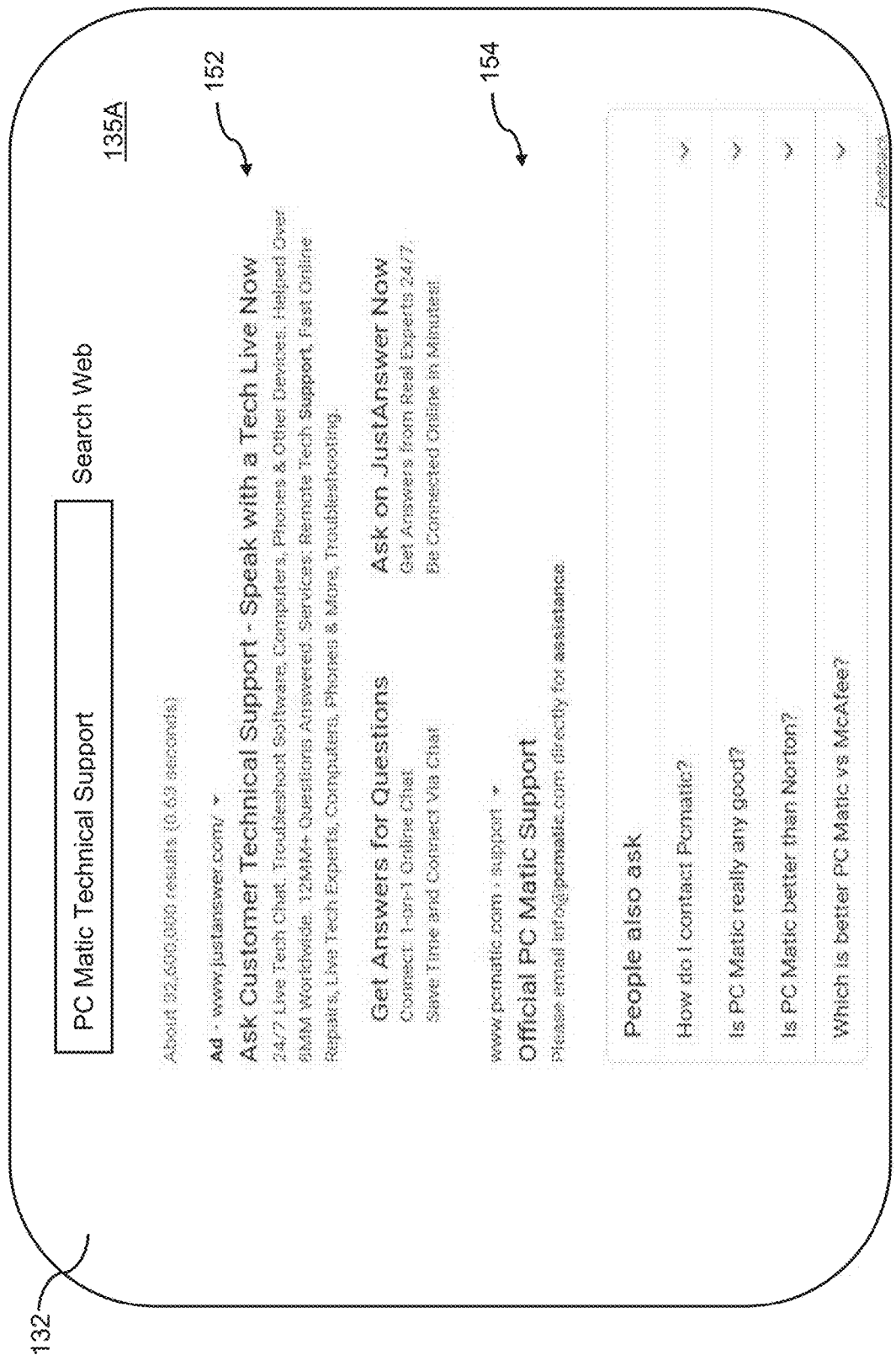
FIG. 9 illustrates a browser user interface of the prior art showing search results.

Referring to FIGS. 8 and 9, a search query 100B of the prior art is made in FIG. 8 and simplified search results 135A of the prior art are shown in FIG. 9. After the user enters "PC Matic™ Technical Support" in the search term 104 field of FIG. 8, the page 135A of the prior art is displayed on the display 86 of the device 10. As an example, this simplified search results 135A has a paid advertisement 152 and what appears to be a bonified link to technical support for PC Matic™—the real party. As this paid advertisement is not claiming to be anything it isn't and is likely a legitimate service, the interceptor 14 does not find any unauthorized advertisement and would allow this advertisement to be displayed.

Figure 10:
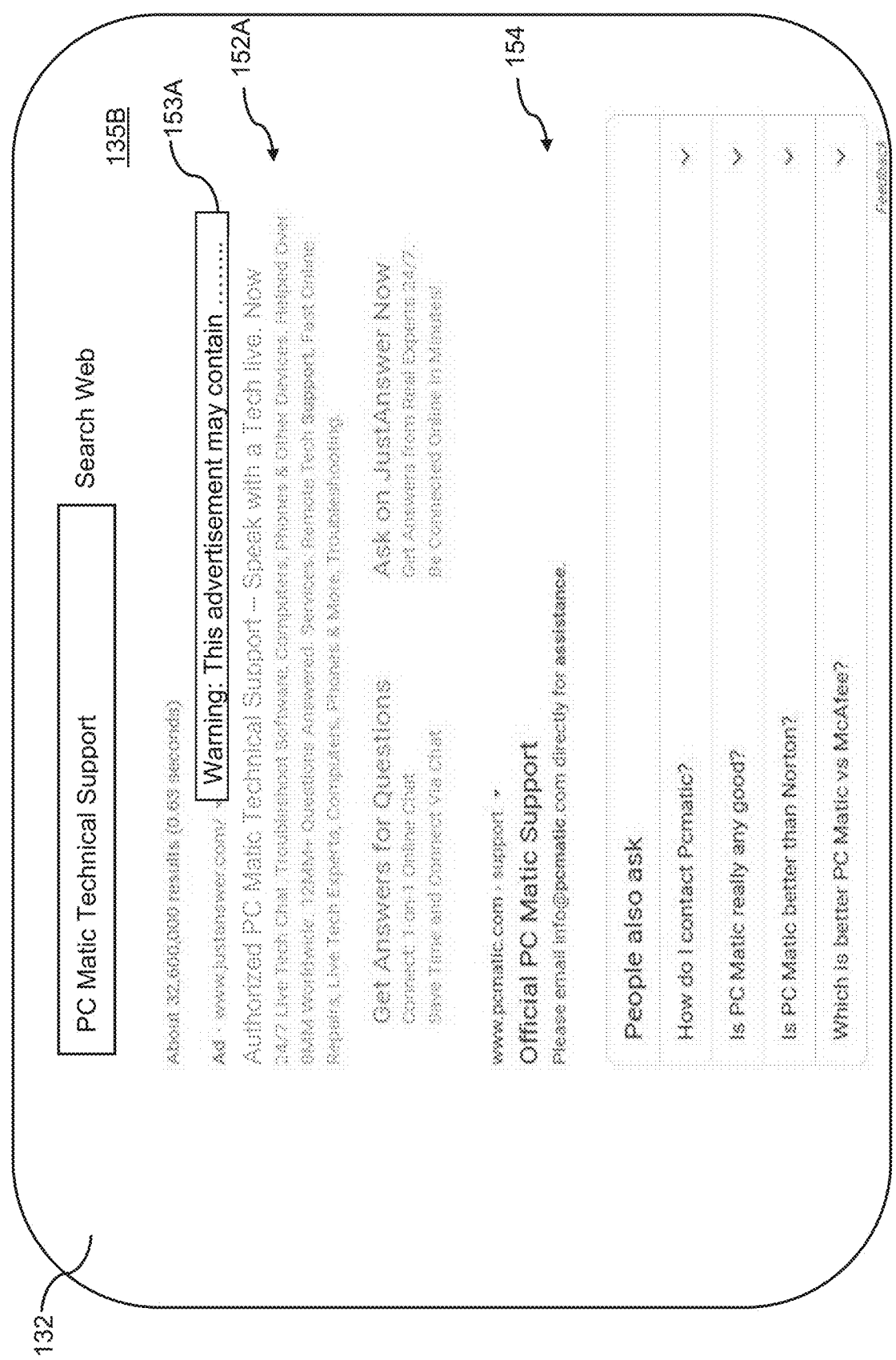
FIG. 10 illustrates a browser user interface showing search results on a user device protected by the advertising detection system.
Figure 11:
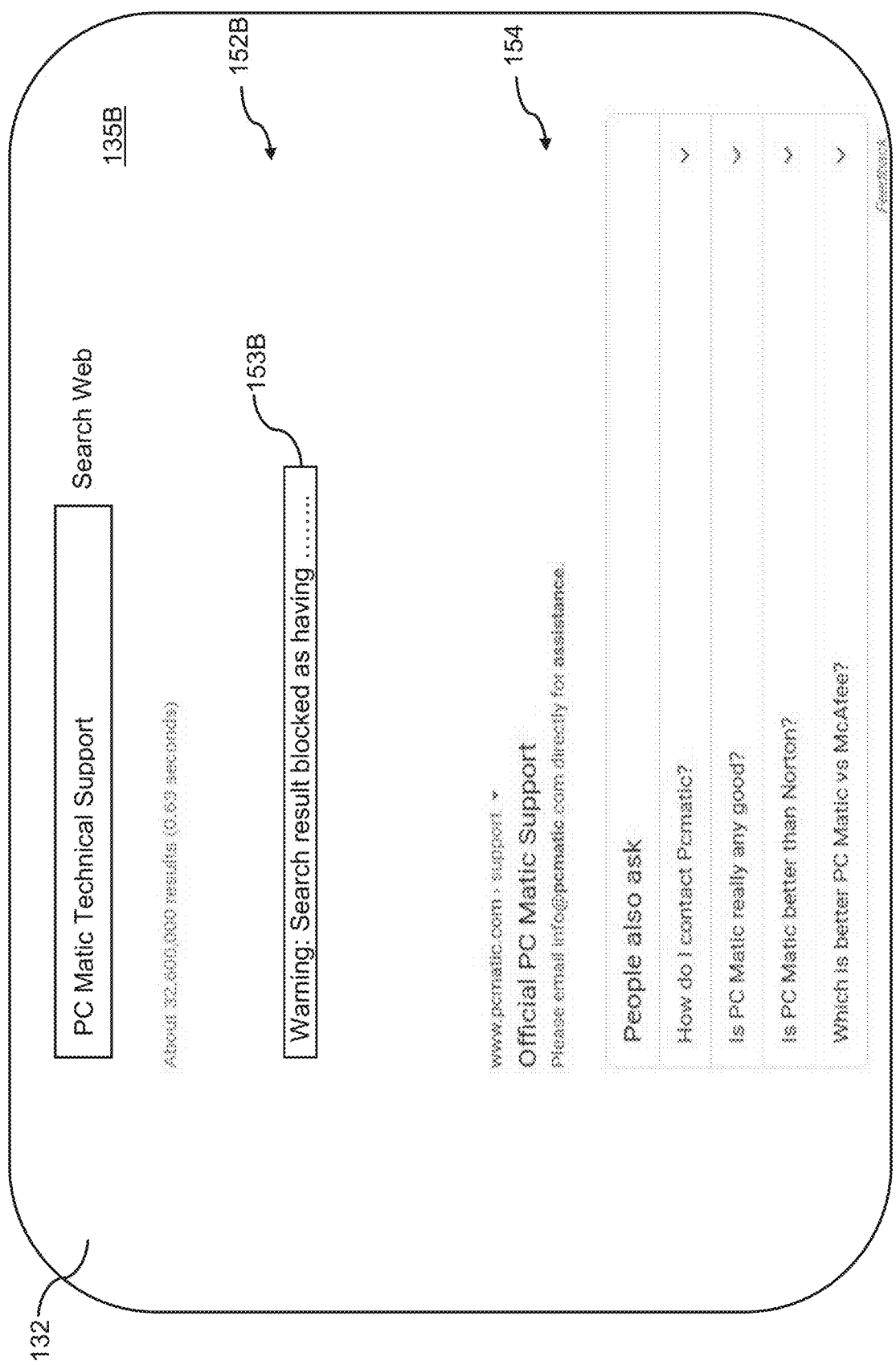
FIG. 11 illustrates a second browser user interface showing search results on a user device protected by the advertising detection system.

Referring to FIGS. 10 and 11, the same search query as was made in FIG. 8 yielding slightly different search results 135B. In the search results 135B, the advertisement 152A indicates that the company is an "Authorized PC Matic™ Technical Support" organization, using the tradename of another company (the real party). Such advertisements 152A are often used to gain customers for the advertisement's company at the potential loss of that customer to the real party. It may be that this company provides technical support, though the quality may be less than the real party for which the user is looking. This advertisement's company often charges for their services, potentially higher fees than the real party, especially when some actual companies offer free technical support. In some instances, the advertisement's company is fictitious and clicking on the advertisement's 152A link may result in false charges against the user's credit card, identity theft, theft of data from the device 10, etc. In FIG. 10, the interceptor 14 has recognized that the advertisement 152A is an unauthorized advertisement and has muted the advertisement 152A while displaying a warning message 153A. In this example, the advertisement 152A is muted by displaying the text in lower contrast (e.g. gray text instead of black text) or any other way known to indicate the text is of less importance and, hence muted. Note that it is anticipated that the warning message 153A vary depending upon the potential threat of the advertisement 152A. For example, in some embodiments, the warning message 153A includes wording indicating that, although the advertising company might provide technical support, it isn't the real party for which you are looking. In some embodiments, the warning message 153A includes wording that is stronger indicating that the advertising company might be engaged in identity theft, etc.

In FIG. 11, the interceptor 14 has recognized that the advertisement 152B is an unauthorized advertisement and has suppressed the advertisement 152B while displaying a warning message 153B. Note that it is anticipated that the warning message 153B vary depending upon the potential threat of the advertisement 152B. In this example, the warning message 153B includes wording that the advertisement 152B has been blocked and in some embodiment, includes reasons for blocking such as indicating that the advertising company might be engaged in identity theft, etc.

Figure 12:
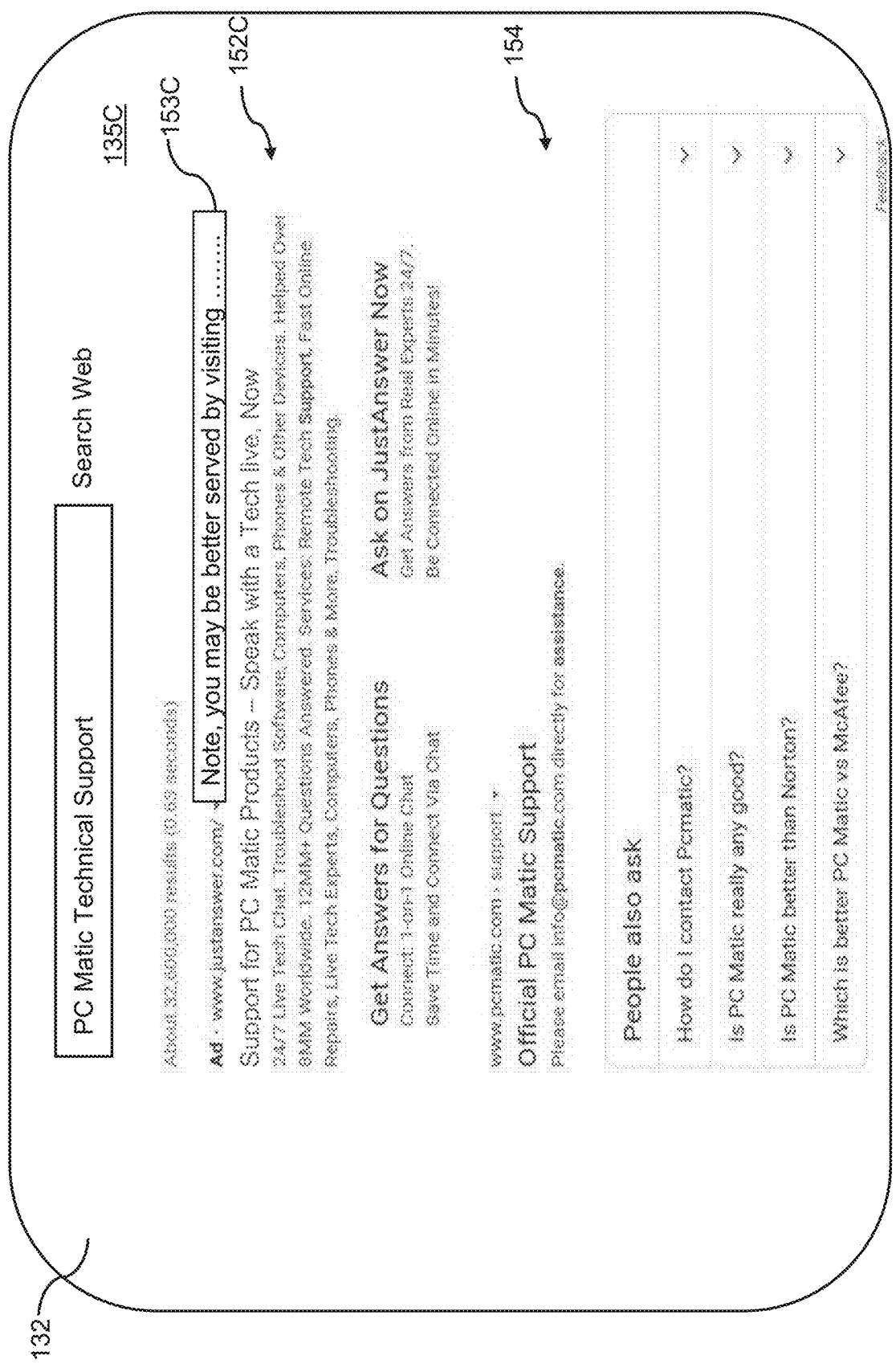
FIG. 12 illustrates a third browser user interface showing search results on a user device protected by the advertising detection system.

Referring to FIG. 12, the same search query as was made in FIG. 8 is shown with the slightly different search results 135C. In the search results 135C, the advertisement 152C indicates that the advertiser's company is provides technical support for PC Matic™ products. Such advertisements 152C are often legitimate but may lead the user to a less qualified technical support organization or to a more expensive resolution, especially if the real party (e.g. PC Matic™) provides support at no cost to the user. Therefore, in FIG. 12, the interceptor 14 has recognized that the advertisement 152C is an unauthorized advertisement, though possibly a legal advertisement and a legal company. The interceptor 14 displays a note message 153C. Again, it is anticipated that note messages 153C vary depending upon the advertisement 152C. For example, in some embodiments, the note message 153C includes wording indicating that support by the real party is offered for free, providing a web address and/or phone number of the real party. In some embodiments, the warning message 153A includes wording that is stronger indicating that the advertising company might be engaged in identity theft, etc.

Figure 13:
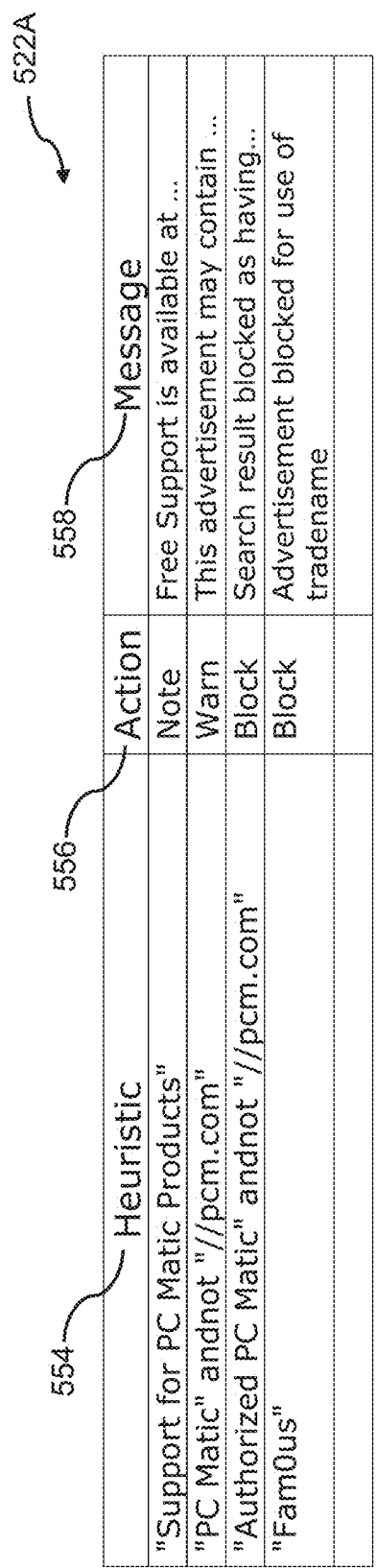
FIG. 13 illustrates an exemplary heuristic database of the advertising detection system.

Referring to FIG. 13, a sample database of cached heuristics 522A is shown. Note that it is anticipated that the master database of heuristics 522 contain similar data as the database of cached heuristics 522A that is cached at the device 10. In this example, the first entry (row 2) has a heuristic 554 of "Support for PC Matic Products" and if any advertisement or search result is found having this string is treated as per the action 556 which is "Note." Therefore, if any advertisements or search results with such a string are found, a message 558 indicating the text of the note is presented.

The second entry has a heuristic 554 of "PC Matic" and not "//pcm.com" and if any advertisement or search result is found having the string "PC Matic" but not having the string "//pcm.com" is treated as per the action 556 which is "Warn." Therefore, if any advertisements or search results of such are found, a message 558 indicating the text of the warning is presented and, per the action 556 of warn, the advertisement is dimmed.

The third entry has a heuristic 554 of "Authorized PC Matic" and not "//pcm.com" and if any advertisement or search result is found having the string "Authorized PC Matic" but not having the string "//pcm.com" is treated as per the action 556 which is "Block." Therefore, if any advertisements or search results of such are found, a message 558 indicating the text of the warning is presented and, per the action 556 of block, the advertisement is suppressed.

The fourth entry has a heuristic 554 of "Fam0us" and if any advertisement or search result is found having the string "Fam0us" is treated as per the action 556 which is "Block." Therefore, if any advertisements or search results of such are found, a message 558 indicating the text of the warning is presented and, per the action 556 of block, the advertisement is suppressed.

Note that the heuristics are anticipated to provide various boolean functions including wild cards and any types of connectors such as "and," "or,", "and not," "not," "next to," etc. In this way, the author of the database of cached heuristics 522A will be able to create heuristics that properly identify various perturbations of advertising/search content without needing a separate heuristic for every possible wording of such. Further, it is anticipated that the master database of heuristics 522 be in source format (e.g. as shown in FIG. 13), but the database of cached heuristics 522A that is downloaded to the devices be object code created by compiling the master database of heuristics 522, providing faster run-time operation and providing greater difficulty for owners of the unauthorized advertisements to be able to work around the heuristics.

Figure 14:
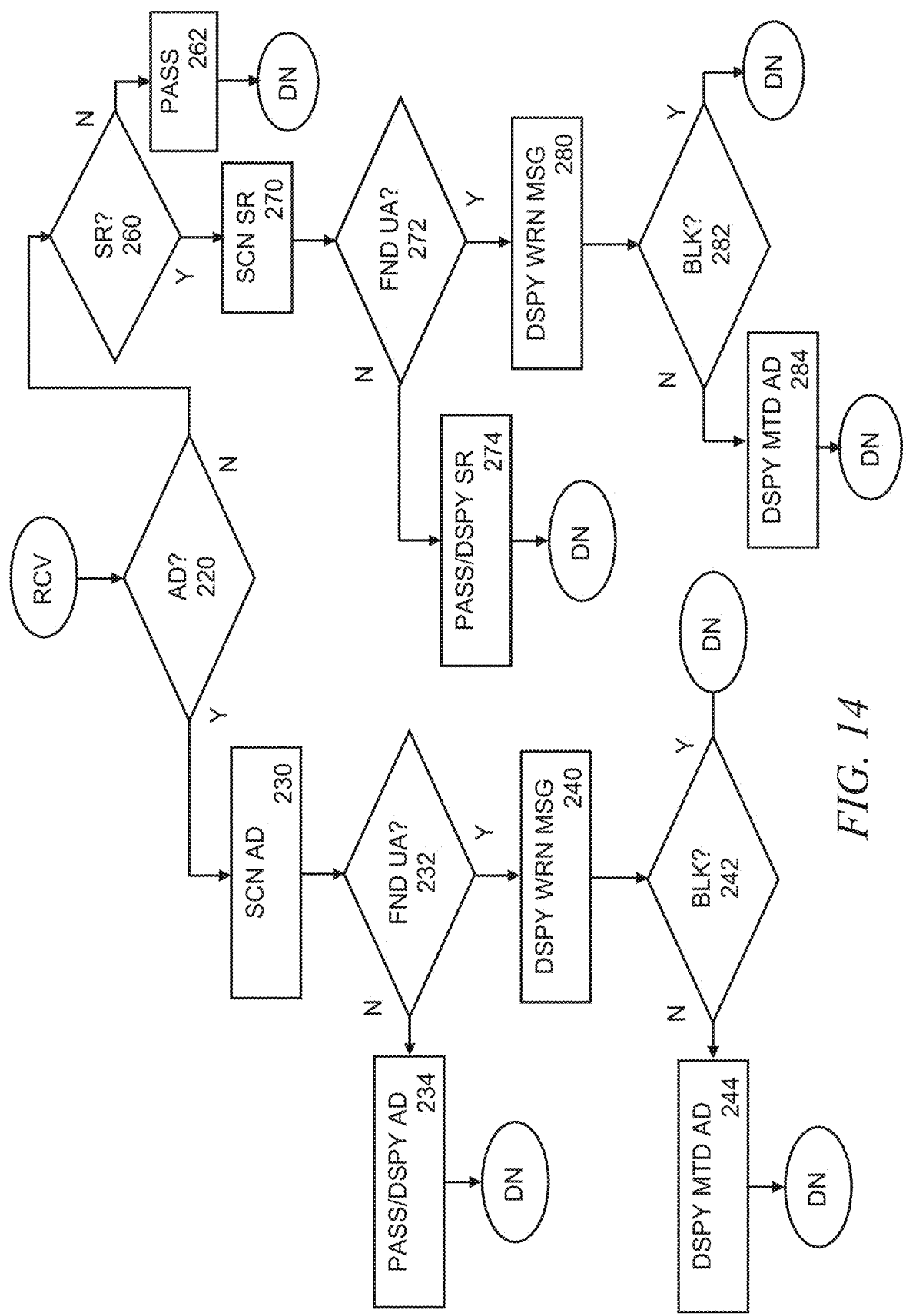
FIG. 14 illustrates an exemplary program flow of the advertising detection system.

Referring to FIG. 14, an exemplary program flows of the method for detecting false advertisement is shown. In the embodiments shown, program flow begins when data is received (e.g. data that will be passed to the browser 12 for viewing by the user on the display 86). As the data is received, it is parsed and it is determined if an advertisement is being received 220. If an advertisement is being received 220, the advertisement is scanned 230 using heuristics from the database of cached heuristics 522A. If the scanning 230 does not find an unauthorized advertisement 232, the data is passed on to the browser 12 and the advertisement is displayed 234.

If the scanning 230 finds an unauthorized advertisement 232, a warning message is displayed 240. Next, if the action associated with the heuristic is "block," 242 flow ends and the data is not displayed or passed to the browser 12 for display. If the action associated with the heuristic is anything other than "block," 242 the data is displayed (e.g. passed to the browser 12 for display).

If an advertisement is not being received 220, it is determined 260 if search results are being received. If it is determined 260 that something other than search results are being received, that data is passed 262 to the browser 12 and the process ends. If it is determined 260 that search results are being received, the search results are scanned 270 using heuristics from the database of cached heuristics 522A. If the scanning 270 does not find an unauthorized search results 272, the data is passed on to the browser 12 and the advertisement is displayed 274.

If the scanning 270 finds unauthorized search results 232, a warning message is displayed 280. Next, if the action associated with the heuristic is "block," 282 flow ends and the data is not displayed or passed to the browser 12 for display. If the action associated with the heuristic is anything other than "block," 282 the data is displayed (e.g. passed to the browser 12 for display).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for intercepting unauthorized content, the system comprising:
   a device protected by the system for monitoring advertisements, the device having a processor, a display, and a network interface, the network interface providing a data connection between the device and a web page server;
   a database of heuristics, each heuristic identifying at least one of the unauthorized content;
   browser software running on the processor causes the processor to transmit a request for a web page to the web page server;
   responsive to the request, the web page server transmits the web page to the device, the web page comprising content;
   after the device receives the web page, interceptor software running on the processor causes intercepts the web page;
   the interceptor software analyzes the content by searching the content for the unauthorized content for a match of a heuristic in the database of heuristics
   when the interceptor software finds the heuristic in the content and an action that is associated with the heuristic indicates notate, the interceptor software causes the processor to display a warning message on the display; and
   the interceptor software causes the processor to display the content on the display with a notation associated with the at least one heuristic.

2. The system of claim 1, wherein when the interceptor software finds the heuristic in the content and an action associated with the heuristic further indicates warn, when the interceptor software causes the processor to display the content in muted format on the display.

3. A method of protecting a device from unauthorized content, the method comprising:
   storing a database of heuristics in a storage of the device, the storage accessible by a computer of the device;
   software running on the computer, the software intercepting data that is transmitted from a web page sever to the device over a data a network, the data being intended for displaying on a display of the device by a browser;
   the software determining if the data includes unauthorized content by finding at least one heuristic in the database of heuristics that indicates that the data includes unauthorized content;
   when the data includes the unauthorized content, the software taking an action that is associated with the at least one heuristic; and
   when the action that is associated with the at least one heuristic indicates notate, the step of taking the action that is associated with the at least one heuristic comprises displaying of the data with a notation associated with the at least one heuristic.

4. The method of claim 3, wherein the step of software taking an action that is associated with the at least one heuristic further comprises mute, displaying the data in muted form.

5. Program instructions tangibly embodied in a non-transitory storage medium for protecting a device from unauthorized content, wherein the program instructions comprise:
- computer readable instructions running on a processor of the device causing the processor to browse to a web page and receive data from the web page;
- the computer readable instructions running on the processor of the device causing the processor to analyze the data using a database of heuristics and determine if the data contains the unauthorized content by finding one heuristic in the database of heuristics that matches at least a subset of the data; and
- when it is determined that the data includes the unauthorized content and an action associated with the one heuristic is warn or notify, the computer readable instructions running on the processor of the device displays a warning message, along with a notation associated with the at least one heuristic.

6. The program instructions tangibly embodied in the non-transitory storage medium of claim 5, wherein when the action indicates notify, the computer readable instructions running on the processor of the device further displays the unauthorized content.

7. The program instructions tangibly embodied in the non-transitory storage medium of claim 5, wherein when the action indicates warn, the computer readable instructions running on the processor of the device displays the unauthorized content in muted format.

8. The program instructions tangibly embodied in the non-transitory storage medium of claim 5, wherein when the action indicates block, the computer readable instructions running on the processor of the device blanks the unauthorized content.

9. The system of claim 1, wherein when the database of heuristics includes heuristics that search for known misspellings of company names.

10. The system of claim 1, wherein when the database of heuristics includes heuristics that search for phone numbers of known unauthorized providers.

\* \* \* \* \*